United States Patent [19]

Kedzierski

[11] Patent Number: 4,633,758

[45] Date of Patent: Jan. 6, 1987

[54] DOUBLE-ACTING WORKING CYLINDER HAVING A PISTON-DAMPENING ARRANGEMENT

[75] Inventor: Heinrich Kedzierski, Wennigsen, Fed. Rep. of Germany

[73] Assignee: WABCO Westinghouse Steuerungstechnik GmbH & Co., Hanover, Fed. Rep. of Germany

[21] Appl. No.: 665,259

[22] Filed: Oct. 26, 1984

[30] Foreign Application Priority Data

Oct. 26, 1983 [DE] Fed. Rep. of Germany ....... 3338781

[51] Int. Cl.[4] ....................... F15B 15/26; F15B 15/22; F16F 11/00; B65H 59/10

[52] U.S. Cl. ........................................... 91/44; 91/45; 92/9; 92/12; 92/16; 92/24; 92/27; 92/85 A; 92/85 B; 188/67; 188/271

[58] Field of Search ...................... 92/9, 11, 12, 16, 20, 92/24, 27, 28, 85 A, 85 B, 243; 91/44, 45; 188/67, 271

[56] References Cited

U.S. PATENT DOCUMENTS

| | | | |
|---|---|---|---|
| 2,394,785 | 2/1946 | Kindervater | 91/44 X |
| 3,353,455 | 11/1967 | Berry | 92/27 X |
| 3,511,048 | 5/1970 | Nemetz | 92/24 X |
| 3,665,812 | 5/1972 | Hashimoto et al. | 92/27 X |
| 3,905,278 | 9/1975 | Ourdouillie | 92/85 A X |
| 4,497,394 | 2/1985 | Ferrand et al. | 92/9 X |

FOREIGN PATENT DOCUMENTS

| | | | |
|---|---|---|---|
| 832143 | 5/1981 | U.S.S.R. | 92/28 |

*Primary Examiner*—Robert E. Garrett

*Assistant Examiner*—George Kapsalas

*Attorney, Agent, or Firm*—G. E. Hawranko

[57] ABSTRACT

A fluid-pressure-operated, double-acting working cylinder which dampens the final braking of the work piston, includes a cylinder housing with a movable work piston disposed therein, the work piston dividing the cylinder into two work chambers. A piston rod, on which the work piston is mounted, extends through the housing. At least one auxiliary braking member is disposed on at least one side of the work piston in an offset slidable relation to the work piston. A braking arrangement disposed on the auxiliary braking member is controlled by fluid pressure to brake the auxiliary braking member to a desired position within the cylinder. A dampening chamber, a dampening spring configuration is disposed between the auxiliary braking member work piston such that, following braking of the auxiliary braking member, continued movement of the work piston is effectively dampened. An auxiliary check valve formed in the auxiliary braking member allows communication of fluid pressure between the dampening chamber and the auxiliary braking arrangement to increase the effective braking of the auxiliary braking member. A throttle is disposed on the auxiliary braking member to allow communication of the fluid pressure in the dampening chamber to the work chamber into which the work piston is moving. A check valve is disposed between the pressurized work chamber and the dampening chamber to allow fluid pressure introduced to the pressurized work chamber to flow into the dampening chamber thereby pressurizing the dampening chamber as well.

16 Claims, 1 Drawing Figure

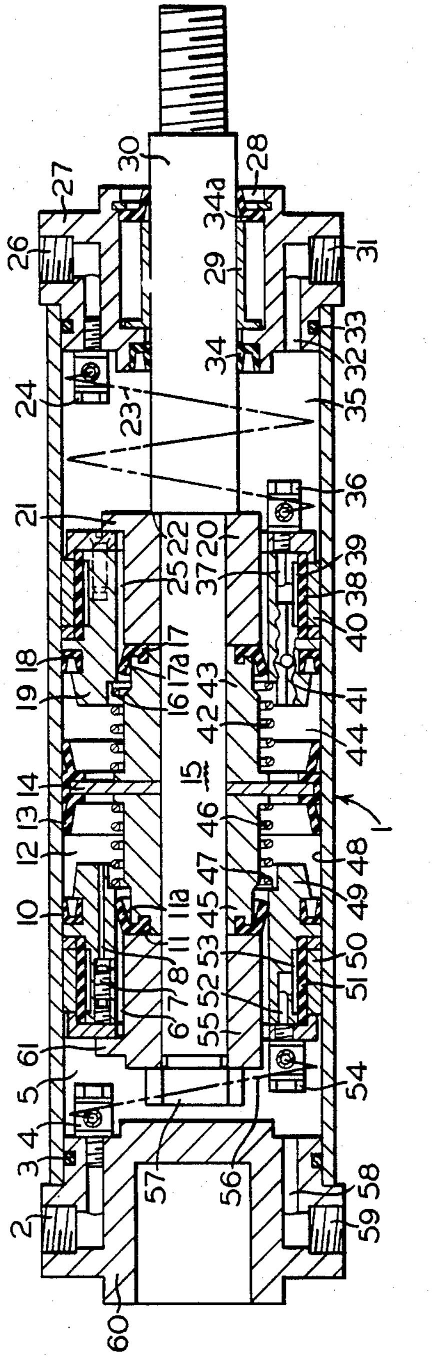

DOUBLE-ACTING WORKING CYLINDER HAVING A PISTON-DAMPENING ARRANGEMENT

BACKGROUND OF THE INVENTION

This invention relates to a fluid-pressure-operated, double-acting working cylinder having a piston-dampening arrangement which effects the final braking of a piston within the working cylinder. More specifically, this invention relates to such a working cylinder having a piston-dampening arrangement which effects an accurate positioning of the output shaft utilizing a small amount of fluid pressure relative to the mass of the object which is to be positioned.

Typically, working cylinders which have dampened the final braking operation of the piston have done so only at the end positions of the piston, and have utilized an obstruction-type dampening at the ends of the cylinder, which obstruction dampening impedes the final movement of the piston. Such an arrangement has the disadvantage that the piston braking operation can only be dampened in the end positions and not in any desired intermediate position.

On working cylinders which are used as so-called "positioning" cylinders, however, it is necessary to be able to maintain the work piston in a desired intermediate position. For the positioning of a work cylinder, in other words, the retention of the working piston in any desired intermediate position, a braking arrangement disclosed in U.S. Pat. No. 4,073,217 can be used. On this braking arrangement, the working piston has, on its outer surface, a wedge-shaped activator which can be activated by pressure medium for radially moving braking elements which can be brought into a friction-tight connection with the inside wall of the cylinder. This approach, however, has the disadvantage that, when the working piston and the objects to be positioned or moved, have a large mass, a rapid braking without a dampening arrangement can only be accomplished by means of special design measures and control mechanisms. Specifically, on such devices, it is not possible to arrive at the desired adjustable position with the necessary precision, accuracy, and ability to repeatedly reproduce identical results.

SUMMARY OF THE INVENTION

It is, therefore, an object of the invention to provide a double-acting working cylinder having a dampening arrangement effecting the final braking of a piston within the working cylinder, which can precisely position the piston in any possible intermediate position.

It is a further object of the invention to provide such a working cylinder which can accurately dampen the movement of the piston by using a small amount of fluid pressure relative to the mass of the object to be positioned.

Briefly, the invention consists of a cylinder housing having a movable piston and piston rod arrangement disposed therein. Symetrically-placed at a distance along the piston rod and on opposing sides of the piston, are first and second auxiliary brake members, each having fluid-pressure-operated, expansible chamber, braking element configurations which, when pressurized, engage the chamber wall to effect a dampening of the braking of the work piston. Disposed between each of the auxiliary brakes and the work piston is a spring or other tension member which dampens movement of the work piston toward either one of the auxiliary brakes; the auxiliary brakes being mounted on a piston rod in a sliding, axial manner relative to the work piston. A dampening chamber, disposed between each of the auxiliary brakes and the work piston, is pressurized with fluid pressure introduced to work chambers which operate the work piston through check valves formed in each of the auxiliary brakes. A throttling arrangement is also formed in each of the auxiliary brakes to allow restricted flow of fluid pressure from the dampening chamber to the nonpressurized work chamber when the corresponding auxiliary brake has been stopped. Such fluid pressure, present in this dampening chamber, is also directed through a second check valve arrangement disposed in each auxiliary brake to one of two brake pressure chambers used to engage the friction elements disposed on the auxiliary brake with the chamber wall.

BRIEF DESCRIPTION OF THE DRAWINGS

FIG. 1 is an elevational view, in section, of a double-acting working cylinder having a piston dampening arrangement, constructed in accordance with the invention.

DESCRIPTION AND OPERATION

As seen in FIG. 1, a fluid-pressure-operated, double-acting working cylinder having a dampening arrangement effecting the final piston braking operation includes a cylinder housing 1, wherein is disposed a reciprocally movable work piston 14 which separates a cylinder chamber 48 into first and second working chambers 5, 35.

The cylinder housing 1 is closed on one end with a first cylinder cover 60 and a first cover gasket 3, and the cylinder housing 1 is closed on the opposite end with a second cylinder cover 27 sealed by means of a second cover gasket 33. The second cylinder cover 27 has a rod opening 28 formed therein, through which a piston rod 30, coaxially disposed in the cylinder chamber 48, extends for external connection thereto. For a sealed guidance of the piston rod 30 through the second cylinder cover 27, two annular rod gaskets 34 and 34a are provided. The guidance of the piston rod 30 through the second cylinder cover 27 is assisted by the use of a guide bushing 29. This bearing of the piston rod 30 and the second cylinder cover 27 is comparatively low friction, and is designed whereby the guide bushing 29 has a relatively long axial length, thereby preventing tipping or slanting of the piston rod 30 as it travels in the out of the cylinder housing 1.

The work piston 14 seats on a graduated portion 15 of the piston rod 30 and has first and second piston components 43, 45 between which the work piston 14 is effectively secured.

To fasten the work piston 14 on the graduated portion 15 of the piston rod 30, there is a nut 57 which can be screwed onto a corresponding thread formed on the piston rod 30 at one end of the cylinder housing 1. Between the nut 57 and a step 22 of the piston rod 30, a first sleeve 55, the first piston component 45, the work piston 14, the second piston component 43, and a second sleeve 20 are clamped.

Disposed on the one side of the work piston 14, between the first piston component 45 and the first sleeve 55, is a first auxiliary piston-like brake member 49, which at least partially surrounds the first sleeve 55 and the first piston component 45 in an annular manner. The first auxiliary brake 49 is sealed against the inner wall of the cylinder housing 1 by a first gasket 10. A second gasket 11, disposed between the first piston component 45 and the first auxiliary brake 49, seals between the work piston 14 and the first auxiliary brake 49. The first auxiliary brake 49 is subjected to the tension of a first spring 46 disposed between the work piston 14 and a first spring seat 47, formed on the first auxiliary brake 49, such first spring 46 urging the first auxiliary brake 49 in a direction axially opposite the work piston 14 and against a first step 61 formed on the first sleeve 55.

A piston packing cup 13 is disposed around the work piston 14 such that the first and second work chambers 5, 35 are sealed against one another.

As seen in FIG. 1, the second gasket 11 is formed in a cup-shaped manner and is clamped between the first piston component 45 and the first sleeve 55 such that an outer flap portion 11*a*, which acts as a check valve between the first work chamber 5 and a first dampening chamber 12, formed within the cylinder chamber 48 between the work piston 14 and the first auxiliary brake 49, allows the flow of fluid pressure from the first work chamber 5 to the first dampening chamber 12. A first annular space 6 is formed between the first sleeve 55 and the first auxiliary brake 49 leading to the flap portion 11*a*, check valve configuration such that, the fluid pressure from the first work chamber 5 can flow therethrough to the first dampening chamber 12.

Coresponding to the first auxiliary brake 49, on the opposite side of the work piston 14, is a second auxiliary brake 19, which at least partially surrounds the second sleeve 20 and the second piston component 43 in an annular manner. The second auxiliary brake 19 is subjected to the tension of a second spring 42, disposed between the work piston 14 and a second spring seat 16 formed on the second auxiliary brake 19, such second spring 42 urging the second auxiliary brake 19 in a direction axially opposite the work piston 14 and against a second step 21 formed on the second sleeve 20. Toward the inside wall of the cylinder chamber 48, the second auxiliary brake 19 is sealed by means of a third gasket 18. The second auxiliary brake 19 is sealed against the second piston component 43 and thus the work piston 14, by means of a fourth gasket 17, which is similar in construction to the second gasket 11, disposed on the opposite side of the work piston 14. The second gasket 11 is also formed in a cup-shaped manner and is clamped between the second piston component 43 and the second sleeve 20 such that an outer flap portion 17*a*, which acts as a check valve between the second work chamber 35 and a second dampening chamber 44, formed within the cylinder chamber 48 between the work piston 14 and the second auxiliary brake 19, allows the flow of fluid pressure only from the second working chamber 35 to the second dampening chamber 44.

For the normal pressurization of the working cylinder, a first and second pressure opening 59 and 31 are provided for respectively pressurizing the first and second work chambers 5, 35. A first pressure passage 58 extends from the first pressure opening 59 into the first working chamber 5, and a second pressure passage 32 extends from a second pressure opening 31 to the second working chamber 35.

Also formed in the first and second cylinder covers 60, 27 are first and second auxiliary openings 2, 26, which allow the introduction of fluid pressure to the first and second auxiliary brakes 49, 19 over respective first and second flexible connecting line arrangements 4, 24. The first and second flexible connecting line arrangements 4, 24 each include a flexible, spiral-shaped air line 56, 23. In this manner, it can be appreciated that, as the work piston 14 moves in either direction within the cylinder chamber 48, the pressure connection is maintained to the first and second auxiliary brakes 49, 19. First and second pressure fittings 4*a*, 54, 24*a*, 36 connect the respective first and second air lines 56, 23 to the respective first and second cylinder covers 60, 27 and first and second auxiliary brakes 49, 19.

With regard to the first auxiliary brake 49, the first pressure connecting line 4 is in fluid communication via a first braking passage 52, with a first braking chamber 53 formed around the circumference of the first auxiliary brake 49. The first braking chamber 53 is sealed against the inside wall of the cylinder chamber 48 with a first elastic membrane 51 which, when the first braking chamber 53 is pressurized, can expand outward in the manner of a bellows. Between the first elastic membrane 51 and the inner wall of the cylinder chamber 48, there is a plurality of first braking elements 50 distributed around the circumference of the first auxiliary brake 49. The plurality of first braking elements 50 may also be of a single part which can be displaced radially outward so that, as they contact the inside wall of the cylinder chamber 48, a friction-tight connection is made.

Similar to the pressurization of the first auxiliary brake 49, the second pressure connecting line 24 allows fluid communication, via a second braking passage 37, with a second braking chamber 39 formed around the circumference of the second auxiliary brake 19. The second braking chamber 39 is also sealed against the inside wall of the cylinder chamber 48 with a second elastic membrane 38 which, when the second braking chamber 39 is pressurized, can expand outward in the manner of a bellows. Between the second elastic membrane 38 and the inner wall of the cylinder chamber 48, there is also disposed a plurality of second braking elements 40 distributed around the circumference of the second auxiliary brake 19. The plurality of second braking elements 40 may also be of a single construction and also required to be displaced radially outward so that, when they come into contact with the inside wall of the cylinder chamber 48, a friction-tight connection is established here as well.

First and second auxiliary check valves 62, 41 are disposed in the respective first and second auxiliary brakes 49, 19, and are oriented such that fluid pressure will flow from the respective first and second dampening chambers 12, 44 into the respective first and second braking chambers 53, 39 under certain conditions as will be explained hereinafter in further detail. It will be noted that only the second auxiliary check valve 41 is shown diagrammatically in FIG. 1.

Also disposed within the first and second auxiliary brakes 49, 19 are first and second throttles 7, 9, which effectively bridge around the respective second and fourth gasket, check valve configurations 11, 17. The first and second throttles 7, 9 allow the restricted flow of fluid pressure present in one of the first or second dampening chambers 12, 44 to the one work chamber 5 or 35, which has not been pressurized to move the work piston 14. In other words, the work chamber 5 or 35,which the work piston 14 is moving into, receives an additional amount of fluid pressure to assist in the stopping of the movement of the work piston 14. It will be noted that such flow of fluid pressure through the respective throttle 7, 9 only occurs following stopping of the corresponding first or second auxiliary brake 49, 19. This occurs because, if the associated auxiliary brake 49, 19 is moving as well, the dampening chamber 12 or 44 will not be compressed to create a pressure that could flow through the first and second throttles 7, 9. It will be noted that only the first throttle 7 is illustrated and consists of a first throttle passage 8 and first screw **7*a*** which can adjust the throttle opening thereby.

In operation, it will be assumed that it is desired to have the piston rod 30 in the shown retracted position, thus corresponding to the leftward positioning of the work piston 14. A pneumatic control system (not shown) is connected to the various pressure openings 59, 31, 2, 26, and supplies fluid pressure to effect movement of the work piston 14, and braking of the auxiliary brakes 49, 19 according to the desired positioning. It will also be assumed that a positioning determining device (not shown) is used in conjunction with the work cylinder to thus provide information regarding the positioning of the work piston 14, or possibly the auxiliary brakes 49, 19 within the cylinder chamber 48. It is also possible, using the pneumatic control system and the positioning determining device, to regulate the pressurization of the working cylinder such that the positioning can be anticipated and the braking of the auxiliary brakes 49, 19 can be effected prior to the desired final position to thus slow down the work piston 14 prior to stopping the work piston 14.

To achieve this leftward positioning of the work piston 14 within the cylinder chamber 48, fluid pressure is introduced to the second work chamber 35 through the second pressure opening 31. Such fluid pressure introduced to the second work chamber 35 also flows into the second dampening chamber 44 through the second annular space 25 and the gasket check valve 17. If, by measuring the position of the work piston 14, it is determined that the first auxiliary brake 49 has reached the predetermined position, the fluid pressure introduced to the second work chamber 35 can be interrupted and fluid pressure can then be directed to the first auxiliary opening 2, thereby pressurizing the first braking chamber 53 such that the first elastic membrane 51 expands and the plurality of first braking elements 50 contacts the cylinder wall to stop the first auxiliary brake 49. With the plurality of first braking elements 50 in friction-tight contact with the inner wall of the cylinder chamber 48, the first auxiliary brake 49 is then held in place. On account of the relatively low mass of the first auxiliary brake 49 and the comparatively small volume of the fluid pressure flowing in the first connecting line 4, used to control the pressurization of the first braking pressure chamber 53, the first auxiliary brake 49 is stopped very quickly and very precisely. The first auxiliary brake 49, stopped in this manner, then forms to a certain extent, a stationary wall on the side of the work piston 14 not pressurized by the fluid pressure used to move the work piston 14.

Simultaneous to the stopping and holding of the first auxiliary piston 49, the first working chamber 5 is pressurized to some extent due to further work piston 14 movement, as will now be described. Given that the first auxiliary brake 49 is stopped and fluid pressure to the second work chamber 35 is simultaneously interrupted, the work piston 14 and piston rod 30 can still move to the left, if only on account of the masses involved, those masses including that of the objects being controlled by the work cylinder as well. The volume of the first dampening chamber 12 is then reduced and the pressure in the first dampening chamber 12 is correspondingly increased, since the gasket, check valve 11 prevents an evacuation of this first dampening chamber 12. A pressure relief of the first dampening chamber 12 takes place only via the first throttle 7, disposed within the first auxiliary brake 49 and the first auxiliary check valve 62, also formed within the first auxiliary brake 49. The first throttle 7 allows the flow of fluid pressure from the first dampening chamber 12 to the first work chamber 5, and the first auxiliary check valve 62 allows fluid pressure transfer from the first dampening chamber 12 to the first braking chamber 53. On account of the dynamic processes, therefore, the first dampening chamber 12 is evacuated in a throttled manner. This means that the movement of the work piston 14 is braked and dampened. If the throttling arrangement is appropriately sized to correspond to the customary load and speed of movement of the work piston 14, the work piston 14 will ultimately come into contact with the first auxiliary brake 49 and thus will reach precisely the specified position in a dampened manner.

The fluid pressure which arises in the first dampening chamber 12 during the braking of the work piston 14, which pressure is also conducted via the first auxiliary check valve 62 into the first braking chamber 53, increases the effective braking pressure in the first braking pressure chamber 53. In this manner, the braking force of the plurality of first braking elements 50 is increased at precisely the moment when the braking force must be the greatest. Since, even with a relatively minor axial extension of the plurality of first braking elements 50, there is a relatively large surface area for the friction-tight connection between the inner wall of the cylinder chamber 48 and the plurality of first braking elements 50, a very large braking force on the first auxiliary brake 49 is achieved. This braking force can be large enough so that, even with a continued pressurization of the second work chamber 35, by means of the fluid pressure connection, the work piston 14 can continue to be held in the predetermined position. There is a corresponding type of operation with a controlled movement of the work piston 14 from the left to the right position. In this case, the second auxiliary brake 19 forms the stationary wall with which the work piston 14 comes into contact when the second auxiliary brake 19 is dampened and reaches the predetermined position.

With the principal embodiment of the invention now having been fully detailed, it should be appreciated that alternate embodiments are possible as well. As an example, in place of the first and second elastic membranes 51 and 38 for the activation of the plurality of braking elements 40, 50, a pressure medium activated piston can also be used. It is also possible that, instead of the described dampening chambers, a piston-like projection can be provided on the work piston 14 with a corresponding recess on the auxiliary brake, whereby the recess holds the piston-like projection in a sealed manner. It is also possible that the dampening chamber can also be formed directly by the work piston, by a thrust piece located on the appropriate side of the work piston, and in a friction-tight connection with the work piston.

Although the hereinabove-described forms of embodiments of the invention constitute preferred forms, it can be appreciated that other modifications may be made thereto without departing from the scope of the invention as set forth in the appended claims.

I claim:

1. A fluid-pressure-operated, double-acting working cylinder having a dampening arrangement for dampening final piston braking, said working cylinder comprising:

(a) a cylinder housing having a chamber formed therein;

(b) a work piston, reciprocally movable within said chamber, divides said chamber into first and second work chambers;

(c) a piston rod connected to said work piston for coincident movement therewith;

(d) at least one auxiliary braking member coaxially, slidably disposed on said piston rod to one side of said work piston;

(e) auxiliary braking means disposed on said at least one auxiliary braking member for selectively braking said at least one auxiliary braking member to a desired position within said chamber relative to said work piston;

(f) dampening means disposed between said at least one auxiliary braking member and said work piston for dampening movement of said work piston toward said at least one auxiliary braking member following a braking of said at least one auxiliary braking member effected by said auxiliary braking means; and (g) throttling means disposed within said chamber for restricting communication of such fluid pressure between said dampening means and at least one of said first and second work chambers following braking of said at least one auxiliary braking member.

2. A working cylinder, as set forth in claim 1, further comprising at least one auxiliary check valve disposed on said at least one auxiliary braking member in a manner such that, following braking of said at least one auxiliary braking member, fluid pressure can be communicated to said auxiliary braking means from said dampening means.

3. A working cylinder, as set forth in claim 1, wherein said at least one auxiliary braking member includes a first and a second auxiliary braking member, disposed in coaxial sliding relation on opposing sides of said work piston.

4. A working cylinder, as set forth in claim 3, further comprising first and second auxiliary check valves disposed on respective said first and second auxiliary braking members such that, following braking of at least one of said first and second auxiliary braking members, fluid pressure can be communicated to said auxiliary braking means from said dampening means.

5. A working cylinder, as set forth in claim 2, wherein said auxiliary braking means includes a plurality of braking elements disposed around the circumference of said at least one auxiliary braking member, and pressurizing means for directing an amount of fluid pressure to said plurality of braking elements and effecting frictional engagement of said plurality of braking elements with said chamber thereby.

6. A working cylinder, as set forth in claim 5, wherein said pressurizing means includes at least one spiral-shaped flexible air line connected between said housing an said at least one auxiliary braking member, at least one auxiliary braking chamber formed around the circumference of said at least one auxiliary braking member, and at least one expansible bladder disposed between said at least one auxiliary braking chamber and said plurality of braking elements and operable such that, when fluid pressure is directed to said at least one auxiliary braking chamber, said at least one expansible bladder expands thus urging said plurality of braking elements into frictional engagement with said chamber thereby braking said at least one auxiliary braking member to such desired position.

7. A working cylinder, as set forth in claim 2, wherein said dampening means includes at least one pressurizable dampening chamber formed between said work piston and said at least one auxiliary braking member, at least one piston component disposed within said at least one dampening chamber adjacent said work piston and in surrounding relation to a portion of said piston rod, and at least one dampening spring surrounding at least a portion of said at least one piston component and extending between said work piston and said at least one auxiliary braking member.

8. A working cylinder, as set forth in claim 7, further comprising at least one sleeve member disposed on said piston rod adjacent said at least one piston component, said at least one auxiliary braking member surrounding at least a portion of said at least one sleeve member and contacting a step portion formed on said at least one sleeve member such that, when said at least one auxiliary braking member is in a nonbraking condition, said step portion urges said at least one auxiliary braking member in one direction along with said at least one sleeve member.

9. A working cylinder, as set forth in claim 8, further comprising a check valve formed by a flap portion of a cupshaped gasket disposed between said at least one sleeve member and said at least one piston component.

10. A working cylinder, as set forth in claim 9, further comprising an annular space formed between said at least one sleeve member and said at least one auxiliary braking member, said check valve being disposed such that fluid pressure introduced to at least one of said first and second work chambers flows into said at least one dampening chamber.

11. A working cylinder, as set forth in claim 7, wherein said throttling means includes a throttle passage formed in said at least one auxiliary braking member such said at least one dampening chamber is in throttled communication with at least one of said work chambers, and a throttle screw adjustable within said throttle passage such that, fluid communication through said throttle passage can be adjusted.

12. A working cylinder, as set forth in claim 7, wherein said auxiliary braking means includes a plurality of braking elements disposed around the circumference of said at least one auxiliary braking member, and pressurizing means for directing an amount of fluid pressure to said plurality of braking elements and effecting frictional engagement of said plurality of braking elements with said chamber thereby.

13. A working cylinder, as set forth in claim 12, wherein said pressurizing means includes at least one spiralshaped flexible air line connected between said housing and said at least one auxiliary braking member, at least one auxiliary braking chamber formed around the circumference of said at least one auxiliary braking member, and at least one expansible bladder disposed between said at least one auxiliary braking chamber and said plurality of braking elements and operable such that, when fluid pressure is directed to said at least one auxiliary braking chamber, said at least one expansible bladder expands thus urging said plurality of braking elements into frictional engagement with said chamber thereby braking said at least one auxiliary braking member to such desired position.

14. A working cylinder, as set forth in claim 13, wherein said at least one auxiliary check valve is oriented such that fluid pressure present in said at least one dampening chamber can be communicated to said at least one auxiliary braking chamber.

15. A working cylinder, as set forth in claim 1, further comprising a piston packing cup secured to said work piston and in sliding, fitted relation to said chamber, said piston packing cup having first and second cup-shaped surfaces facing respectively said first and second work chambers.

16. A working cylinder, as set forth in claim 15, wherein said at least one auxiliary braking member has a contoured projecting portion contoured in shape to said first and second cup-shaped portions such that said contoured projecting portion fits within said first and second cup-shaped surfaces.

* * * * *